US008700234B2

(12) United States Patent
Shafaat et al.

(10) Patent No.: US 8,700,234 B2
(45) Date of Patent: Apr. 15, 2014

(54) SYSTEM AND METHOD FOR COMMUNICATING INTENT OF AIRCRAFT

(75) Inventors: Syed Taji Shafaat, Everett, WA (US); Samuel T. Clark, Federal Way, WA (US)

(73) Assignee: The Boeing Company, Chicago, IL (US)

(*) Notice: Subject to any disclaimer, the term of this patent is extended or adjusted under 35 U.S.C. 154(b) by 1261 days.

(21) Appl. No.: 12/123,993

(22) Filed: May 20, 2008

(65) Prior Publication Data

US 2009/0292408 A1 Nov. 26, 2009

(51) Int. Cl.
*G01C 23/00* (2006.01)
*G06F 7/00* (2006.01)
*G06F 17/00* (2006.01)
*G06F 19/00* (2011.01)
*G06G 7/76* (2006.01)

(52) U.S. Cl.
USPC ............ 701/14; 701/3; 701/4; 701/7; 701/15; 701/16; 701/18; 701/408; 701/467

(58) Field of Classification Search
None
See application file for complete search history.

(56) References Cited

U.S. PATENT DOCUMENTS 5,596,332 A * 1/1997 Coles et al. .................. 342/455
6,873,903 B2 * 3/2005 Baiada et al. ................ 701/120
6,952,631 B2 * 10/2005 Griffith et al. ................. 701/13
7,222,017 B2 5/2007 Clark et al.
7,385,527 B1 * 6/2008 Clavier et al. ................ 340/945
7,570,178 B1 * 8/2009 Whalen et al. ............... 340/961
7,787,999 B1 * 8/2010 Barber ........................... 701/14
7,813,871 B2 * 10/2010 Small et al. .................. 701/120
8,004,427 B2 * 8/2011 Goodman et al. ............ 340/945
8,019,529 B1 * 9/2011 Sharma et al. ............... 701/117
2008/0036659 A1 * 2/2008 Smith et al. .................. 342/454
2008/0071434 A1 * 3/2008 Fortier et al. .................. 701/15
2008/0125972 A1 * 5/2008 Neff ............................. 701/300
2009/0018713 A1 * 1/2009 Coulmeau et al. ............... 701/3

OTHER PUBLICATIONS

U.S. Appl. No. 11/555,884 entitled: Runway Status Indication and Traffic Information Display and Filtering, Samuel T. Clark, et al, filed Nov. 2, 2006.
U.S. Appl. No. 11/744,671 entitled: Autorange for Electronic Airport Moving Map, Samuel T. Clark, et al, filed May 4, 2007.
U.S. Appl. No. 11/841,453 entitled: Traffic Display System, Aircraft Including the Display System and Method of Displaying Off-Scale Traffic in the Display System, Samuel T. Clark, et al., filed Aug. 20, 2007.

* cited by examiner

*Primary Examiner* — Khoi Tran
*Assistant Examiner* — Bao Long T Nguyen
(74) *Attorney, Agent, or Firm* — Klintworth & Rozenblat IP LLC

(57) ABSTRACT

A method of an aircraft communicating a current position status, a current movement status, a current intent, and/or an intended future path, position, or intent of the aircraft may include the aircraft generating explicit first ownship information related to the current position status and/or the current movement status, or current intent of the aircraft, and/or a flight management or other aircraft system of the aircraft generating information related to the intended future path, position, or intent of the aircraft. The aircraft may transmit the explicit first ownship information and/or the second information using an automatic dependent surveillance broadcast system transmitter. An airborne and/or ground receiver may receive the transmitted information related to the explicit first ownship information and/or the second information.

16 Claims, 2 Drawing Sheets

SYSTEM AND METHOD FOR COMMUNICATING INTENT OF AIRCRAFT

BACKGROUND

Automatic dependent surveillance broadcast systems on aircraft are often used to broadcast technical data such as latitude, longitude, speed, heading, and/or other parameters regarding the position of the aircraft. However, this broadcasted information does not explicitly identify the current position status, current movement status, and/or the intent of the aircraft. For instance, the broadcasted information does not explicitly identify what exact runway the aircraft is crossing on, departing, or approaching for landing on, whether the aircraft is moving or stopped, and/or other explicit information regarding the aircraft's current position status and/or current movement status. Moreover, the broadcasted information does not identify the intended future operation, intent, or positions of the aircraft. This may make it difficult for other aircraft and/or for ground air traffic control to know the real-time explicit position status, the real-time explicit movement status, and the real-time intended future path of the aircraft.

A system and/or method is needed to decrease one or more problems associated with one or more of the existing systems and/or methods for broadcasting aircraft information.

SUMMARY

In one aspect of the disclosure, a method of an aircraft communicating is disclosed. In one step information is automatically generated comprising a name of a position an aircraft is located at, is approaching, is leaving, is taking off from, is landing on, or intends to be located at in the future. In another step, the information is transmitted using a transmitter. In an additional step, the transmitted information is received with a receiver.

In another aspect of the disclosure, a system is disclosed for communicating information regarding an aircraft. The system includes a device, a transmitter, and a receiver. The device is for automatically generating information comprising a name of a position an aircraft is located at, is approaching, is leaving, is taking off from, is landing on, or intends to be located at in the future. The transmitter is for transmitting the information. The receiver is for receiving the transmitted information.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
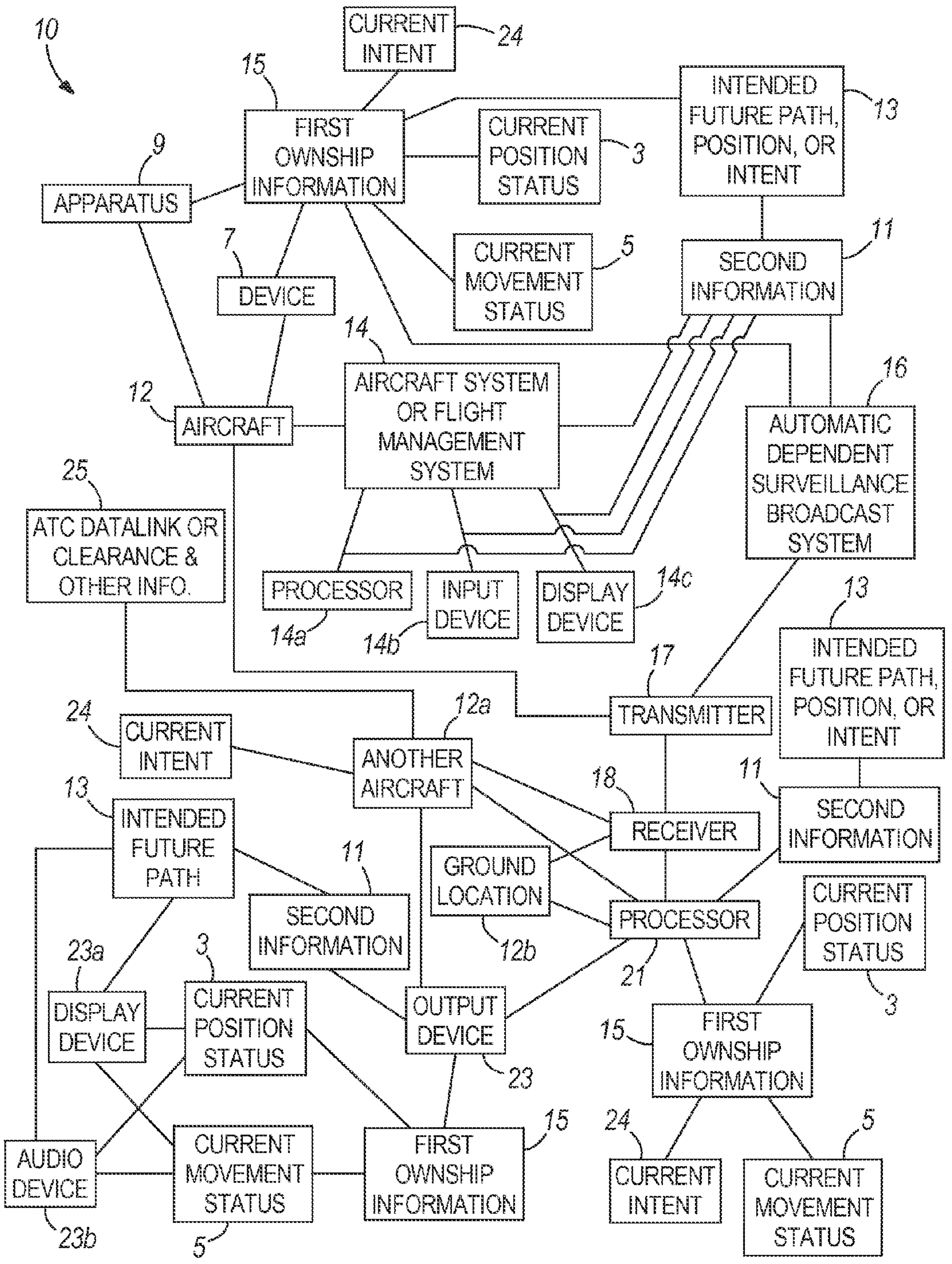
FIG. 1 shows a box diagram of a system for communicating at least one of a current position status or current movement status or current intent of an aircraft and an intended future path, position, or intent of the aircraft.

FIG. 1 shows a box diagram of a system 10 for communicating at least one of current position status 3 and current movement status 5 of an aircraft 12, current intent 24 of an aircraft 12, and/or an intended future path, position, or intent 13 of the aircraft 12. The system 10 may include the aircraft 12, a device 7, an apparatus 9, a flight management or other aircraft system 14, an automatic dependent surveillance broadcast system 16, a transmitter 17, a receiver 18, a processor 21, and/or an output device 23. In other embodiments the system 10 may include varying numbers and types of the listed components and/or other types of non-listed components.

The device 7 and/or apparatus 9 may be used to generate explicit first ownship information 15 related to the current position status 3, current intent 24, and/or current movement status 5 of the aircraft 12. The apparatus 9 may comprise at least one of a global position system, a non-global position system comprising an inertial reference system, or a ground radio station for generating the explicit first ownship information 15 related to ownship current position information 3. The ownship current position information 3 may identify a current position the aircraft 12 is located at such as a runway the aircraft 12 is currently on, a runway the aircraft 12 is currently heading towards, a runway the aircraft 12 is currently taking off from, a runway the aircraft 12 is approaching or landing on, and/or a precise position the aircraft 12 is located at in flight or on a ground surface.

The explicit first ownship information 15 may comprise current movement status 5 or intent 24 based on one or more configurations of at least one device 7 of the aircraft 12. The at least one device 7 may include at least one of a thrust indication or thrust lever, a flap or flap lever, a gear or gear lever, a speedbrake or speedbrake lever, an autobrake switch position or state, a brake pedal, a parking brake switch, a fuel control switch, a TOGA switch, a light switch, a flight control device, a landing device, a glideslope device, a sensor, a localizer device, and/or other type of device. The current movement status information 5 may identify the current movement status of the aircraft 12 such as: whether the aircraft 12 is currently stopped on or holding short of a runway; whether the aircraft 12 is currently moving in a direction on a runway; whether the aircraft 12 is currently past a runway; whether the aircraft 12 is currently taking off in a direction; whether the aircraft 12 is currently flying in a direction; whether the aircraft 12 is currently ascending in a direction; whether the aircraft 12 is currently maintaining a flight position in a direction; whether the aircraft 12 is currently changing a flight position in a direction; whether the aircraft 12 is currently descending in a direction; whether the aircraft 12 is currently landing in a direction; whether the aircraft 12 is currently stopping in a direction; a timing status of the aircraft 12; a spacing status of the aircraft 12; a distance status of the aircraft 12; and/or other types of ground, landing, take-off, or flight movement status information such as taxi or navigation route and ATC clearances regarding the aircraft 12.

The explicit first ownship information 15 may show ownship current intent 24 (such as stop/hold short of runway, crossing runway, takeoff, RTO, landing, go around, runway exiting, clear of runway, etc) using information available only to ownship or most timely determined by ownship such as thrust lever position, flap, gear, speedbrake position, autobrake position, TOGA, glideslope information, localizer information used to indicate actual intended landing runway, flight control, and/or other system, state, configuration, taxi or navigation route, or ATC clearance information. This use of such timely and reliable explicit first ownship information 15 may be beneficially advantageous versus time consuming other ship observation and calculation of ownship or traffic intent, or time consuming ownship observation and calculation of other ship intent, which may take too long and be too late to be useful. The broadcast of explicit first ownship or other ship information 15 showing the current/immediate intent, status, and/or movement of the aircraft 12 may provide explicit information regarding the aircraft 12 such as taxi, takeoff, RTO, climb, turn, descent, a specific gate number, on pushback, on a specific taxiway, heading a certain direction, holding short of a specific runway number, on takeoff on a specific runway number, on approach on a specific runway number, exiting a specific taxiway , clear of a specific runway number, and/or other types of specific information regarding the current/immediate intent, status, and/or movement of the aircraft 12.

The disclosure may allow for aircraft 12 to take advantage of their capability to broadcast their intent and/or present status with higher accuracy and integrity than it is possible with GPS updating. The aircraft 12 may broadcast, in addition to automatic dependent surveillance broadcast data, their status as to where they are and also their immediate intent depending upon their airplane configuration. For example, an aircraft 12 that is taxiing may broadcast "on taxiway 'tango2 heading east". An aircraft 12 that is holding short of runway XY left/right may broadcast "holding short of runway XY left/right", or "cleared to cross or crossing runway XY left/right". An aircraft 12 on a runway holding for take off may broadcast "on runway XY left/right, holding for takeoff". An aircraft 12 on takeoff roll may broadcast "cleared to takeoff runaway XY left/right", or "taking off runaway XY left/right". An aircraft 12 on climb-out may broadcast "climbing out from runway XY on standard departure XX". An aircraft 12 in cruise may broadcast that it is "in cruise", or may broadcast that it "changing altitude or flight level to XX". As the aircraft 12 gets closer to the top of descend (TOD), it may broadcast "approaching TOD in X minutes". At any time, if the ownship 12 is following another aircraft, it may broadcast "following aircraft ABC at XX spacing (distance or time)". During descent, an aircraft 12 may broadcast "descending from altitude XY to the next cleared altitude YY". During an aircraft's standard arrival, the aircraft 12 may broadcast that it is "on standard arrival 'STAR ABC'". As the aircraft 12 is sequenced behind another aircraft by the ATC, it may broadcast "following airplane 'ABC' at spacing XXX seconds or YYY nautical miles". During an aircraft's approach to a runway, the aircraft 12 may broadcast that it is "on approach to runway 'AB L/R'". After an aircraft 12 touches down, it may broadcast that it is "on the runway 'AB L/R'" and as soon as it clears the runway, it may broadcast that it is "off the runway 'AB L/R' and on taxiway 'CD'". On an aircraft's way to the gate, if it has to cross any other active runway, the aircraft 12 may broadcast "holding short of runway 'DE L/R'" or while crossing runway "DE L/R" it may broadcast "crossing runway 'DE L/R'". After crossing the runway the aircraft 12 may broadcast "clear of runway 'DE L/R'". During an aircraft's taxi phase, the aircraft 12 may broadcast that it is "on taxiway 'TANGO' heading East". In other embodiments, the aircraft 12 may broadcast other types of information regarding the aircraft's current/immediate intent 24, current position status 3, current movement status 5, and/or future path, position, or intent 13 (such as Estimated Time of Arrival at a position or altitude).

By an aircraft 12 broadcasting its current position/status and intent based on data (such as takeoff thrust set, or programmed flight management system takeoff, route, approach, clearance and other data), in addition to other automatic-dependent-surveillance-broadcast data, the aircraft 12 may provide more timely and reliable important tactical information about itself that other airplanes can use for their flight planning thus improving efficiency and safety. It may also help with certain navigational and display symbology limitations of the system especially on the airport surface to address runway incursion difficulties.

The flight management system 14 may be disposed on or within the aircraft 12, and may be adapted to generate second information 11 related to an intended future path 13 of the aircraft 12 in order to allow future locations of the aircraft 12 to be determined at any future point in time.

In one embodiment, the flight management system 14 may comprise one or more computer processors 14*a*, input devices 14*b*, and display devices 14*c* which are adapted to be programmed with the intended future path (or planned future flight route) 13 of the aircraft 12. The input devices 14*b* may be adapted to input second information 11 regarding the intended future path 13 of the aircraft 12 into the computer processors 14*a*, which may subsequently displayed on the display devices 14*c*. The inputted second information 11 may comprise pilot inputs, real-time aircraft data inputs, taxi route data inputs, route inputs, departure inputs, destination inputs, pilot decisions, datalink ATC clearances 25, and/or on other types of inputs. The inputted second information 11 may incorporate real-time changes in the intended future path 13 of the aircraft 12. If the intended future path 13 of the aircraft 12 is changed at any point in time, by the pilot, due to weather conditions, due to tower instructions, due to air traffic, or due to any other reason, the intended future path 13 in the flight management system 14 may be instantaneously changed to incorporate the changes in the intended future path 13.

The intended future path 13 of the aircraft 12 programmed in the flight management system 14 may include second information 11 related to the aircraft's future departure taxi route, the aircraft's future departure take-off location, the aircraft's future flight path from a future departure take-off location to a future destination landing location, the aircraft's future destination landing location, the aircraft's future destination taxi route, future aircraft performance information, future location versus time information, and/or other types of information related to the aircraft's future flight path 13. The intended future path 13 of the aircraft 12 programmed in the flight management system 14 may include second information 11 such as the exact x, y, z location the aircraft 12 is planned to be located at during any future point in time, the velocity of the aircraft at any future point in time, the bearing/heading of the aircraft at any future point in time, and/or any other type of information related to the aircraft's future flight path.

The automatic dependent surveillance broadcast or other system 16 may be adapted to automatically broadcast/transmit at least one of explicit first ownship information 15 related to the current position status 3, current intent 24, and/or current movement status 5 of the aircraft 12 and/or second information 11 generated by the flight management system 14 related to the real-time intended future path 13 of the aircraft 12. The automatic dependent surveillance broadcast system 16 may be adapted to transmit at least one of the real-time explicit first ownship information 15 and second information 11 from one or more transmitters 17 to one or more receivers 18. The one or more transmitters 17 may be located on the aircraft 12. The one or more receivers 18 may be located on another airborne aircraft 12*a* or at a ground location 12*b*.

The processor 21 may be located on the aircraft 12, the another aircraft 12*a*, or at a ground location 12*b*. The processor 21 may be adapted to process the real-time explicit first ownship information 15 and/or second information 11 in order to determine at least one of the current position status 3, current intent 24, the current movement status 5, and/or the intended future path 13 of the aircraft 12.

The output device 23 may be located on the another aircraft 12*a* and/or a ground location 12*b*. The output device 23 may comprise a display device 23*a*, an audio device 23*b*, and/or another type of output device. The output device 23 may be adapted to output at least one of the real-time explicit first ownship information 15 related to the current position status 3, current intent 24, and/or the current movement status 5 of the aircraft 12, and/or the real-time second information 11 related to the real-time intended future path 13 of the aircraft 12 which may have been generated by the flight management system 14. The outputted explicit first ownship information 15 and/or the outputted second information 11 may have been transmitted by the transmitter 17, received by the receiver 18, and processed by the processor 21. The explicit first ownship information 15 outputted by the output device 23 may establish the real-time current position status 3, current intent 24, and/or the current movement status 5 of the aircraft 12. The second information 11 outputted by the output device 23 may establish the real-time intended future location of the aircraft 12 at any future point in time.

Figure 2:
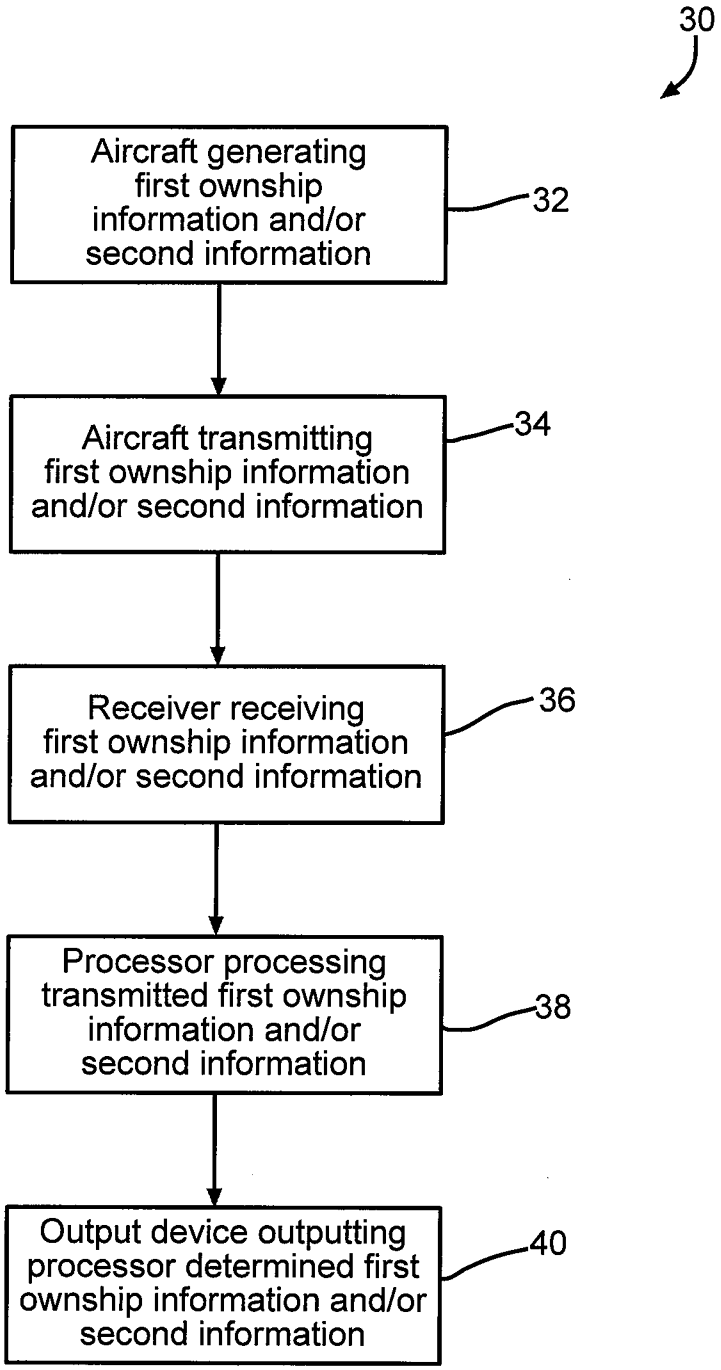
FIG. 2 shows a flowchart of one embodiment of a method of an aircraft communicating at least one of a current position status of an aircraft, current intent, a current movement status of the aircraft, and an intended future path, position, or intent of the aircraft.

FIG. 2 is a flowchart of one embodiment of a method 30 of an aircraft 12 communicating at least one of a current position status 3 of the aircraft 12, a current intent 24, a current movement status 5 of the aircraft 12, and an intended future path, position, or intent 13 of the aircraft 12. In one step 32, the aircraft 12 may generate explicit first ownship information 15 related to the current position status 3 of the aircraft 12, current intent 24, and/or the current movement status 5 of the aircraft 12, and/or a flight management system 14 of the aircraft 12 may generate second information 11 related to the real-time intended future path 13 of the aircraft 12.

The generated explicit first ownship information 15 may comprise ownship current position status information 3 gathered from an apparatus 9 comprising at least one of a global position system, and a non-global position system comprising an inertial reference system or a ground radio station. The ownship current position status information 3 may identify at least one of a runway the aircraft 12 is currently on, a runway the aircraft 12 is currently heading towards, a runway the aircraft 12 is currently taking off from, a runway the aircraft 12 is currently approaching or landing on, and/or a precise position the aircraft 12 is located at in flight or on a ground surface.

The generated explicit first ownship information 15 may comprise ownship current movement status 5 information based on configurations of at least one device 7 of the aircraft 12. The at least one device 7 of the aircraft 12 may comprise at least one of a thrust indication or thrust lever, a flap or flap lever, a gear or gear lever, a speedbrake or speedbrake lever, an autobrake switch position or state, a brake pedal, a parking brake switch, a fuel control switch, a TOGA switch, a light switch, a flight control device, a landing device, a glideslope device, a sensor, a localizer device, and/or another type of device of the aircraft 12. The ownship current movement status 5 information may identify at least one of: whether the aircraft 12 is currently stopped on or holding short of a runway; crossing a runway; whether the aircraft 12 is currently moving in a direction on a runway; whether the aircraft 12 is currently clear of a runway; whether the aircraft 12 is currently taking off in a direction; whether the aircraft 12 is currently flying in a direction; whether the aircraft 12 is currently ascending in a direction; whether the aircraft 12 is currently maintaining a flight position in a direction; whether the aircraft 12 is currently changing a flight position in a direction; whether the aircraft 12 is currently descending in a direction; whether the aircraft 12 is currently landing in a direction; whether the aircraft 12 is currently stopping in a direction; a timing status of the aircraft 12; a spacing status of the aircraft 12; a distance status of the aircraft 12; and/or another type of movement status information regarding the aircraft 12.

The generated second information 11 related to the real-time intended future path 13 of the aircraft 12 may relate to and/or show the aircraft's future departure taxi route, the aircraft's future departure take-off location, the aircraft's future flight path from a future departure take-off location to a future destination landing location, the aircraft's future destination landing location, the aircraft's future destination taxi route, future aircraft performance information, future location versus time information for the aircraft 12, ATC clearances, and/or other types of information related to the aircraft's future flight path 13. The generated second information 11 may show and/or allow the real-time intended future path 13 of the aircraft 12 to be determined in order to establish/show/determine the future locations the aircraft 12 at future times. The generated second information 11 may be based on real-time information which was inputted into one or more input devices 14*b* comprising pilot inputs, data inputs, taxi route data inputs, route inputs, departure inputs, destination inputs, pilot decisions, ATC datalink information such as clearances 25, and/or on other types of inputs.

In another step 34, the aircraft 12 may transmit at least one of the real-time explicit first ownship information 15 and the real-time generated flight management system second information 11 using a transmitter 17 of an automatic dependent surveillance broadcast system 16. In still another step 36, an airborne or ground receiver 18 may receive at least one of the real-time transmitted explicit first ownship information 15 and the real-time transmitted second information 11.

In an additional step 38, a processor 21 may process at least one of the real-time explicit first ownship information 15 and the second information 11 and may determine at least one of the current position status 3 of the aircraft 12, the current movement status 5 of the aircraft 12, current intent 24, and the real-time intended future path 13 of the aircraft 12. In such manner, the processor 21 may determine the current position status 3 of the aircraft 12 and/or the current movement status 5, or current intent 24 of the aircraft 12 based on the explicit first ownship information 15, and/or may determine the future locations of the aircraft 12 at future points in time based on the real-time second information 11. The processor 21 may be located on the aircraft 12, another aircraft 12a, and a ground location 12b. If the processor 21 is located on the aircraft 12, step 38 may take place before step 34. If the processor 21 is located on another aircraft 12 or the ground location 12*b*, step 38 may take place after step 36.

In an additional step 40, an output device 23 on at least one of another aircraft 12*a* and a ground location 12*b* may output at least one of the real-time processor-determined explicit first ownship information 15 and the real-time processor-determined second information 11. The output device 23 may comprise a display device 23*a* which outputs at least one of the explicit first ownship information 15 and the second information 11 as a visual display, an audio device 23*b* which outputs the information in audio, and/or another type of output device. The explicit first ownship information 15 outputted by the output device 23 may establish at least one of the current position status 3, the current movement status 5, or the current intent 24 of the aircraft 12. The second information 11 outputted by the output device 23 may establish the real-time intended future path 13 of the aircraft 12 to establish future locations of the aircraft 12 at future points in time. The outputted second information 11 may include real-time second information 11 such as the exact x, y, z location the aircraft 12 is planned to be located at during any future point in time, the velocity of the aircraft at any future point in time, the bearing/heading of the aircraft at any future point in time, and/or any other type of information related to the aircraft's future flight path or performance.

In such manner, the another aircraft 12*a* and/or ground location 12*b* may receive real-time explicit first ownship information 15 regarding the current position status 3 of the aircraft 12, and/or the current movement status 5, or current intent 24 of the aircraft 12, and/or may receive second information 11 regarding the intended future path 13 of the aircraft 12. The real-time explicit first ownship information 15 and/or real-time second information 11 may encompass real-time, continually changing pilot decision-making/changes to the current position status 3, current movement status 5, current intent 24, and/or intended future path 13 of the aircraft 12 based on flight conditions, flight traffic, and/or other flight-path affecting stimuli. This real-time information regarding the current position status 3, current movement status 5, current intent 24, and/or intended future path 13 of the aircraft 12 may allow the another aircraft 12*a* and/or ground location 12*b* to have real-time intelligent information regarding the current position status 3, the current movement status 5, current intent 24, and/or the current intended future path 13 of the aircraft 12. This may improve air traffic spacing, may reduce the likelihood of air traffic coming too close to one another, may improve the control of air traffic, and/or may reduce one or more other types of problems of one or more of the prior art air traffic systems and/or methods.

It should be understood, of course, that the foregoing relates to exemplary embodiments of the disclosure and that modifications may be made without departing from the spirit and scope of the disclosure as set forth in the following claims.

The invention claimed is:

1. A method of an aircraft communicating comprising:

automatically generating information comprising a name of a runway or taxi-route an aircraft is located at, is approaching, is leaving, is taking off from, is landing on, or intends to be located at in the future, wherein the information is automatically generated further using information from at least one of a thrust indicator, a thrust lever, a flap, a flap lever, a gear, a gear lever, a speedbrake, a speedbrake lever, an autobrake switch component, an autobrake switch position indicator, an autobrake switch state indicator, a brake pedal, a parking brake switch, a fuel control switch, a TOGA switch, a light switch, a glideslope device, or a localizer device;

transmitting the information using a transmitter;

receiving the transmitted information with a receiver; and outputting the received information with an output device located on another aircraft or a ground surface.

2. The method of claim 1 wherein the transmitter comprises an automatic dependent surveillance broadcast system transmitter of the aircraft.

3. The method of claim 1 wherein the automatically generating further comprises automatically generating the information using a global position system.

4. The method of claim 1 wherein the automatically generating further comprises automatically generating the information using an inertial reference system or a ground radio station.

5. The method of claim 1 wherein the automatically generating further comprises automatically identifying whether the aircraft is or intends to be stopped on or holding short of the runway or taxi-route, whether the aircraft is or intends to be moving in a direction on the runway or taxi-route, or whether the aircraft is or intends to be clear of the runway or taxi-route.

6. The method of claim 1 wherein the automatically generating further comprises automatically identifying whether the aircraft is or intends to be taking off in a direction, whether the aircraft is or intends to be flying in a direction, whether the aircraft is or intends to be ascending in a direction, whether the aircraft is or intends to be maintaining a flight position, whether the aircraft is or intends to be changing the flight position, whether the aircraft is or intends to be descending, whether the aircraft is or intends to be landing, whether the aircraft is or intends to be stopping, a timing status of the aircraft, a spacing status of the aircraft, or a distance status of the aircraft.

7. The method of claim 1 wherein the step of automatically generating information comprises automatically generating the information comprising the name of the runway the aircraft is located at, is approaching, is leaving, is taking off from, is landing on, or intends to be located at in the future.

8. The method of claim 1 wherein the step of automatically generating information comprises automatically generating the information comprising the name of the taxi-route the aircraft is located at, is approaching, is leaving, is taking off from, is landing on, or intends to be located at in the future.

9. A system for communicating information regarding an aircraft comprising:

a device for automatically generating information comprising a name of a runway or taxi-route an aircraft is located at, is approaching, is leaving, is taking off from, is landing on, or intends to be located at in the future;

wherein the device automatically generates the information further using information from at least one of a thrust indicator, a thrust lever, a flap, a flap lever, a gear, a gear lever, a speedbrake, a speedbrake lever, an autobrake switch component, an autobrake switch position indicator, an autobrake switch state indicator, a brake pedal, a parking brake switch, a fuel control switch, a TOGA switch, a light switch, a glideslope device, or a localizer device;

a transmitter for transmitting the information; and a receiver for receiving the transmitted information.

10. The system of claim 9 wherein the transmitter is located on the aircraft.

11. The system of claim 9 wherein the transmitter comprises an automatic dependent surveillance broadcast system transmitter of the aircraft.

12. The system of claim 9 wherein the device is located on the aircraft.

13. The system of claim 9 wherein the device comprises a global position system.

14. The system of claim 9 wherein the device comprises an inertial reference system or a ground radio station.

15. The system of claim 9 wherein the device comprises a flight management system.

16. The system of claim 9 further comprising an output device located on another aircraft or a ground surface for outputting the received transmitted information.

* * * * *